United States Patent
Bar et al.

(10) Patent No.: US 10,489,524 B2
(45) Date of Patent: Nov. 26, 2019

(54) SYNTHETIC DATA GENERATION METHOD

(71) Applicant: DEUTSCHE TELEKOM AG, Bonn (DE)

(72) Inventors: Ariel Bar, Ashdod (IL); Barak Chizi, Ashkelon (IL); Dudu Mimran, Tel Aviv (IL); Lior Rokach, Omer (IL); Bracha Shapira, Beer Sheva (IL); Andreas Grothe, Berlin (DE); Rahul Swaminathan, Berlin (DE)

(73) Assignee: Deutsche Telekom AG, Bonn (DE)

( * ) Notice: Subject to any disclaimer, the term of this patent is extended or adjusted under 35 U.S.C. 154(b) by 697 days.

(21) Appl. No.: 14/979,625

(22) Filed: Dec. 28, 2015

(65) Prior Publication Data

US 2016/0196374 A1 Jul. 7, 2016

(30) Foreign Application Priority Data

Jan. 1, 2015 (IL) .......................................... 236556

(51) Int. Cl.
*G06F 17/50* (2006.01)
*G06F 17/18* (2006.01)

(52) U.S. Cl.
CPC .......... *G06F 17/5009* (2013.01); *G06F 17/18* (2013.01)

(58) Field of Classification Search
CPC .................................................. G06F 17/5018
USPC .......................................................... 703/2
See application file for complete search history.

(56) References Cited

U.S. PATENT DOCUMENTS

| | | | | |
|---|---|---|---|---|
| 8,433,670 | B2* | 4/2013 | Chidlovskii | G06Q 10/10 706/46 |
| 9,049,249 | B2* | 6/2015 | Zhang | H04L 67/306 |
| 9,165,255 | B1* | 10/2015 | Shetty | G06N 7/005 |
| 2002/0101920 | A1 | 8/2002 | Choi et al. | |
| 2006/0122998 | A1 | 6/2006 | Bar-Yossef et al. | |
| 2006/0190225 | A1* | 8/2006 | Brand | G06F 17/30867 703/2 |
| 2007/0239694 | A1* | 10/2007 | Singh | G06F 17/30958 |
| 2008/0256065 | A1* | 10/2008 | Baxter | G06F 17/30864 |
| 2010/0121792 | A1* | 5/2010 | Yang | G06F 17/30958 706/12 |
| 2014/0324760 | A1 | 10/2014 | Marwah et al. | |

OTHER PUBLICATIONS

European Search Report from a counterpart foreign application—EP 15202921—dated Apr. 12, 2016, 5 pages.

* cited by examiner

*Primary Examiner* — Andy Ho

(74) *Attorney, Agent, or Firm* — Roach Brown McCarthy & Gruber, P.C.; Kevin D. McCarthy

(57) ABSTRACT

A method for generating synthetic data records which include datasets that capture state-based transitions, according to which a state transition family is randomly selecting, according to the distribution of samples between the different clusters of users and the context variables are randomly sampled according to their distribution within the chosen cluster. The relevant Markov Chains models are selected according to the sampled context and the initial state of the sequence is randomly selected according to the distribution of states. A random walk process is initialized on the graph models and the random walk is performed process on each context separately, assuming context independency. The cause condition of the current transition is sampled for each state transition, based on the distributions on the selected edge.

7 Claims, 1 Drawing Sheet

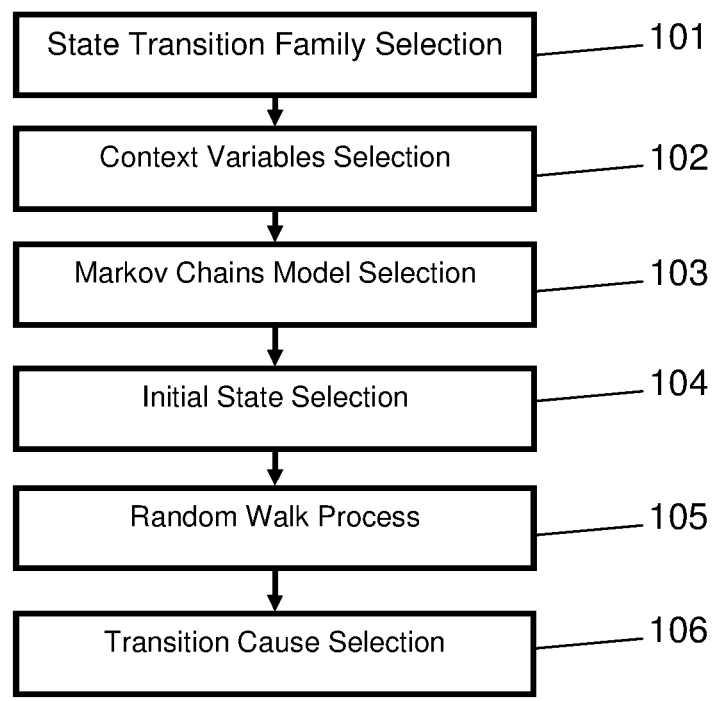

SYNTHETIC DATA GENERATION METHOD

FIELD OF THE INVENTION

The invention is in the field of telecommunication networks. More specifically the invention relates to a method for generating synthetic data records of telecommunication networks.

BACKGROUND OF THE INVENTION

In the modern world, the use of communication networks is almost inevitable, weather if it is cellular communication or computers communication or any other communication platform. The communication companies have therefore, records about every user. A lot of information can be derived from these records. However, using real data of any communication network has always caused a serious privacy problem. General speaking, the main problem is related to the need for protecting the users from unsupervised monitoring. Nevertheless, the need of knowing the nature of data can yield significant value for many applications (e.g., marketing, sales, customer services etc.).

It is therefore a purpose of the present invention to provide a platform for generating synthetic data records, based on modeling of actual networks and while preserving privacy.

Further purposes and advantages of this invention will appear as the description proceeds.

SUMMARY OF THE INVENTION

The present invention is directed to a method for generating synthetic data records which include datasets that capture state-based transitions, according to which a state transition family is randomly selecting, according to the distribution of samples between the different clusters of users and the context variables are randomly sampled according to their distribution within the chosen cluster. The relevant Markov Chains models are selected according to the sampled context and the initial state of the sequence is randomly selected according to the distribution of states. A random walk process is initialized on the graph models and the random walk is performed process on each context separately, assuming context independency. The cause condition of the current transition is sampled for each state transition, based on the distributions on the selected edge.

The datasets may be modeled as original data sources that may include:
a) modeling the trajectory sequences of individuals;
b) modeling a song playlist; and
c) modeling the sequence of the operations performed while accessing a file system.

Synthetic data records which include datasets that capture cause-effect conditions between a set of in telecommunication platforms may be generated by:
a) fabricating conditional multiple attributes by modeling datasets which contain records, where each record is independent of all other records and is fixed with its fields and length;
b) generating fabricated data based on the Bayesian network using a process of Random Walk on the trained network structure, starting from the root of the network;
c) selecting a random assignment to the initial root-cause variable according to its observed distribution; and
d) using the graph structure to selecting and sample the next node (variable) using the values of its predecessor parents according to the distribution learned by the Conditional Probability Tables.

The records may include:
a) records of a user's profile which contain age, gender, education, income, relationship-status, etc.,
b) call center records which contain call length, topic, product category, customer-age, customer-credit-level, and call-sentiment;
c) medical/diagnostic records which contain test results, blood pressure results, results from a Smoking Indicator, diagnostics etc.

The present invention is also directed to a system for generating synthetic data records related to states of users of a telecommunication network, which comprises:
a) a database for storing the states and datasets that capture state-based transitions;
b) a processor which is adapted to:
   b.1) randomly select state transition family, according to the distribution of samples between the different clusters of users;
   b.2) randomly sample context variables according to their distribution within the chosen cluster;
   b.3) select relevant Markov Chains models according to the sampled context;
   b.4) randomly select the initial state of the sequence according to the distribution of states;
   b.5) initialize a random walk process on the graph models and performing the random walk process on each context separately, assuming context independency; and
   b.6) sample the cause condition of the current transition for each state transition, based on the distributions on the selected edge.

All the above and other characteristics and advantages of the invention will be further understood through the following illustrative and non-limitative description of embodiments thereof, with reference to the appended drawings. In the drawings the same numerals are sometimes used to indicate the same elements in different drawings.

BRIEF DESCRIPTION OF THE DRAWINGS

FIG. 1 schematically shows the process of fabricating the state transitions.

DETAILED DESCRIPTION OF EMBODIMENTS OF THE INVENTION

The present invention relates to a method and system which are capable of producing synthetic data records, based on modeling of actual networks and while preserving privacy. Synthetic data production algorithms are used for generating new and fabricated data samples, by utilizing the models learned by the Model and Patterns Creation (MPC) algorithms, which are sets of algorithms that are capable of discovering patterns that reflect the relationships, conditions and constants of the available data. A data synthesis module supports several types of algorithms, since each of the pattern creation models may have a unique model representation. Multiple types of datasets can be fabricated using the data synthesis module. For example, a first type may include datasets which capture state-based transitions of a system or of an individual user. Another type may include datasets which capture cause-effect conditions between a set of variables. The two models are combined in order to synthesize a statistically similar joint dataset consisting of user tracking traces, as well as unique events or network events.

Fabrication of State Transition:

Fabricated data may be generated from an original data source which captures state-based transitions. These data sources may include:

a) modeling the trajectory sequences of individuals (in this case, the states can be spatial coordinates of the location of an individual, cellular base stations in which his mobile device has been registered, points of interest he visited, etc.

b) modeling a song playlist (in this case, the states can be the genre of the song the individual hears, such as pop music, dance music, rock music, etc.)

c) modeling the sequence of the operations performed while accessing a file system (in this case, the states are sets of commands like "open," "read," "write," "delete," etc.).

In order to be able to fabricate reliable data, it is very important to model and synthesize the user tracks. Modeling the user tracks may be implemented, for example, by using the ensemble of Markov chains (a mathematical system that undergoes transitions from one state to another on a state space according to a random process usually characterized as memory-less, where the next state depends only on the current state and not on the sequence of events that preceded it).

The process of fabricating the state transitions is presented in FIG. 1. Generating new fabricated data may be based on the Ensemble of Markov chains (which are often described by a sequence of directed graphs, where the edges of graph n are labeled by the probabilities of going from one state at time n to the other states at time n+1) and involves the following steps: at the first step 101, the state transition family is randomly selected according to the distribution of samples between the different clusters of users. At the second step 102, the context variables are randomly sampled according to their distribution within the chosen cluster. At the next step 103, the relevant Markov Chains models are selected according to the sampled context. At the next step 104, the initial state of the sequence is randomly selected according to the distribution of states. At the next step 105, a process of random walk is initialized on the graph models. At the next step 106, for each state transition, the cause condition of the current transition is sampled, based on the distributions on the selected edge. The random walk process is performed on each context separately, assuming context independency.

Fabrication of Conditional Multiple Attributes

This model is applied on datasets which contain records, where each record may be dependent or independent of all other records and is fixed with its fields and length. This is different from the previous model which supports sequences of different lengths. This model can serve as a solution for every domain that is required to model the relations among a set of random variables. This model is used to synthesize various network events that do not relate to user tracking. Examples of such records may include:

a) records of a user's profile which may contain: age, gender, education, income, relationship-status, etc.;

b) call center records which may contain: call length, topic, product category, customer-age, customer-credit-level, and call-sentiment;

c) medical/diagnostic records which may contain: test results, blood pressure results, results from a Smoking Indicator, diagnostics etc.

Generating new and fabricated data based on the Bayesian network (a probabilistic graphical model that represents a set of random variables and their conditional dependencies via a Directed Acyclic Graph) requires a process of Random Walk (a mathematical formalization of a path that consists of a succession of random steps) on the trained network structure. The process starts from the root of the network, by selecting a random assignment to the initial root-cause variable (Root-Cause analysis involves the collection and study of data to determine a true cause to a problem) according to its observed distribution. Using the graph structure, the next node (variable) is selected and sampled using the values of its predecessor parents according to the distribution learned by the Conditional Probability Tables (CPTs—a CPT is defined for a set of discrete dependent random variables to demonstrate marginal probability of a single variable with respect to the other variables).

Although embodiments of the invention have been described by way of illustration, it will be understood that the invention may be carried out with many variations, modifications, and adaptations, without exceeding the scope of the claims.

The invention claimed is:

1. A method for generating synthetic data records, related to states of users of a telecommunication network, which include datasets that capture state-based transitions, comprising the steps of:

a) randomly selecting state transition family, according to a distribution of samples between different clusters of users;

b) randomly sampling context variables according to their distribution within a chosen cluster;

c) selecting relevant Markov Chains models according to a sampled context;

d) randomly selecting an initial state of a sequence according to a distribution of states;

e) initializing a random walk process on graph models and performing said random walk process on each context separately, assuming context independency;

f) modeling said telecommunication network by discovering patterns that reflect relationships between state transitions;

using a data synthesis module which is configured to combine multiple types of datasets and to generate synthetic data records that are jointly correlated, based on the discovered patterns, to provide services to said users, based on the generated synthetic data records;

wherein the synthetic data records are generated from a first dataset type that captures user tracking traces of state-based transitions between a set of variables in the telecommunication network and from a second dataset type that captures cause-effect conditions between a set of variables in the telecommunication network associated with a network event.

2. The method according to claim 1, wherein the datasets are modeled original data sources, including one or more of the following:

a) modeling trajectory sequences of individuals;

b) modeling a song playlist; and c) modeling a sequence of operations performed while accessing a file system.

3. The method according to claim 1, wherein the records include:

a) records of a user's profile which contain age, gender, education, income, relationship-status, etc.;

b) call center records which contain call length, topic, product category, customer-age, customer-credit-level, and call-sentiment;
c) medical/diagnostic records which contain test results, blood pressure results, results from a Smoking Indicator, diagnostics etc.

4. The method according to claim 1, further comprising the step of sampling a cause condition of a current transition, for each of the state transitions, based on distributions on a selected edge of said the Markov Chains models.

5. The method according to claim 1, further comprising the step of storing the generated synthetic data records in a database.

6. A system for generating synthetic data records related to states of users of a telecommunication network, comprising:
a) a database for storing said states and datasets that capture state-based transitions;
b) a processor which is adapted to:
b.1) randomly select state transition family, according to a distribution of samples between different clusters of users;
b.2) randomly sample context variables according to their distribution within a chosen cluster;
b.3) select relevant Markov Chains models according to a sampled context;
b.4) randomly select an initial state of a sequence according to a distribution of states;
b.5) initialize a random walk process on graph models and performing said random walk process on each context separately, assuming context independency; and
b.6) model said telecommunication network by discovering patterns that reflect relationships between state transitions; and
c) a data synthesis module which is configured to combine multiple types of datasets to generate, based on the discovered patterns, synthetic data records that are jointed correlated, and to store said synthetic data records in said database;
wherein the synthetic data records are generated from a first dataset type that captures user tracking traces of state-based transitions between a set of variables in the telecommunication network and from a second dataset type that captures cause-effect conditions between a set of variables in the telecommunication network associated with a network event.

7. The system according to claim 6, wherein the processor is also adapted to sample a cause condition of a current transition for each of the state transitions, based on distributions on a selected edge of the Markov Chains models.

* * * * *